(12) United States Patent
Benneckenstein et al.

(10) Patent No.: US 10,571,551 B2
(45) Date of Patent: Feb. 25, 2020

(54) SIGNAL GENERATION DEVICE AND METHOD

(71) Applicant: Rohde & Schwarz GmbH & Co. KG, München (DE)

(72) Inventors: Tim Benneckenstein, München (DE); Thomas Roeder, Sauerlach (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 639 days.

(21) Appl. No.: 15/147,846

(22) Filed: May 5, 2016

(65) Prior Publication Data

US 2017/0322289 A1 Nov. 9, 2017

(51) Int. Cl.
*G01S 7/40* (2006.01)
*H04L 27/00* (2006.01)

(52) U.S. Cl.
CPC ........ *G01S 7/4052* (2013.01); *H04L 27/0002* (2013.01)

(58) Field of Classification Search
CPC ............ G01S 7/4052; G01S 2007/406; G01S 2007/4082; G01S 2007/4086; G01S 2007/4095; H04L 27/0002; H04L 27/0004; H03B 19/00; H03B 21/00; H03B 21/01; H03B 21/02; H03B 21/025; H03B 21/04; H03B 2200/007; G01R 31/00; H04B 17/00; H04B 17/20; H04B 17/26; H04B 17/29; H04B 17/30; H04B 17/309; H04B 17/318; H04B 17/336; H04B 17/391; H04B 17/3912; H04B 17/3913; G06F 1/03; G06F 1/025; G06F 1/0314; G06F 1/0321; G06F 1/0328; G06F 1/035; G06F 1/02; G06F 1/0307; G06F 1/0335; H03K 5/00; H03K 2217/9401; H03K 2217/94031
See application file for complete search history.

(56) References Cited

U.S. PATENT DOCUMENTS

| | | | | |
|---|---|---|---|---|
| 5,974,362 | A * | 10/1999 | Owen | H03B 21/00 331/42 |
| 2005/0165567 | A1* | 7/2005 | Inatsune | G01S 7/4008 702/66 |
| 2006/0010184 | A1* | 1/2006 | Huisken | G06F 1/0321 708/270 |
| 2007/0067123 | A1* | 3/2007 | Jungerman | G06F 1/0321 702/67 |
| 2008/0109504 | A1* | 5/2008 | McDonald | G06F 1/022 708/275 |
| 2009/0086833 | A1* | 4/2009 | Chalmers | H04B 17/0085 375/260 |
| 2009/0256640 | A1* | 10/2009 | Reilly | G06F 1/0328 331/45 |

(Continued)

*Primary Examiner* — Bernarr E Gregory
*Assistant Examiner* — Daniel P Malley, Sr.
(74) *Attorney, Agent, or Firm* — Shumaker & Sieffert, P.A.

(57) ABSTRACT

A signal generation device for generating radio frequency, RF, signals, the signal generation device comprising a waveform input for receiving a number of basic waveforms, a control command input for receiving control commands each comprising control information for modifying a respective basic waveform, a RF frontend for transmitting RF signals, and a waveform processor, which based on the control commands modifies the respective basic waveforms and transmits the resulting modified waveforms through the RF frontend.

12 Claims, 7 Drawing Sheets

(56) References Cited

U.S. PATENT DOCUMENTS

| | | | |
|---|---|---|---|
| 2012/0176174 A1* | 7/2012 | Webb, III | G06F 1/025 327/237 |
| 2012/0300825 A1* | 11/2012 | Ito | G06F 13/385 375/226 |
| 2014/0163940 A1* | 6/2014 | Erisman | G06F 17/5036 703/2 |
| 2015/0277906 A1* | 10/2015 | Johnson | G06F 9/3005 712/225 |

\* cited by examiner

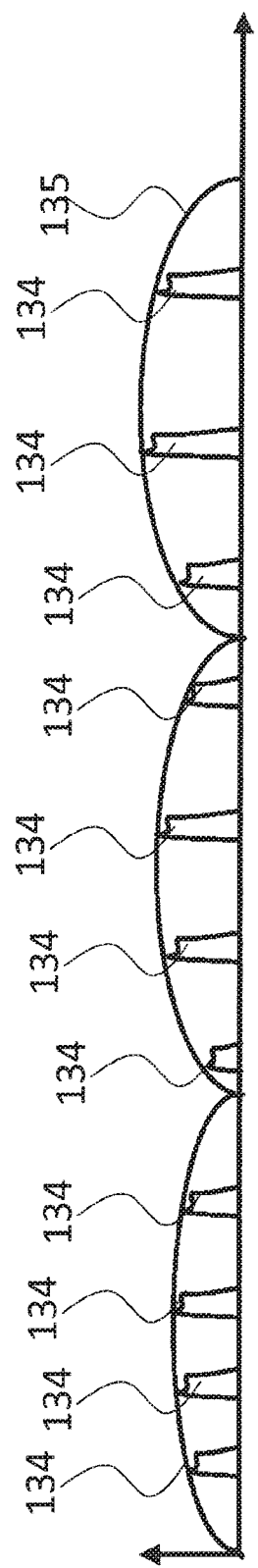

SIGNAL GENERATION DEVICE AND METHOD

FIELD OF THE INVENTION

The invention relates to a signal generation device and to a respective method.

TECHNICAL BACKGROUND

Although applicable to any system that uses RF signals, the present invention will be described in combination with radar signals. In development of radar equipment, extensive testing is necessary to ensure correct functionality of the equipment. Tests of radar equipment can e.g. be realized with real radar emitters, which are placed around the device under test.

As an alternative, a signal simulator can generate simulated radar signals and provide these signals to the device under test. Such signal simulators can be placed next to the device under test and e.g. be coupled to an antenna port of the device under test via cables. However, simulating radar signals is a complex task.

Accordingly, there is a need for simplifying the simulation of radar signals.

SUMMARY OF THE INVENTION

The present invention provides a signal generation device, like e.g. a vector signal generator, for generating radio frequency, RF, signals, the signal generation device comprising a waveform input for receiving a number of basic waveforms, a control command input for receiving control commands each comprising control information for modifying a respective basic waveform, a RF frontend for transmitting RF signals, and a waveform processor, which reads or uses the basic waveforms and based on the control commands modifies the respective basic waveforms and transmits the resulting modified waveforms through the RF frontend.

Radar signals can e.g. be simulated with the help of simulation software. Such software allows e.g. positioning of a plurality of radar emitters, e.g. on a virtual map, parametrizing the radar emitters with different antennas and/or antenna scans, and generating with each radar emitter a configurable sequence of radar pulses. The software calculates in advance a so called ARB file, which contains sample by sample the signal amplitude, which is to be expected a the simulated receiver. At a sample rate of 200 MHz and 4-byte samples for I and Q samples, respectively, a simulation of 4 seconds generates an ARB file of 2.9 GByte. This is a huge amount of data, which is difficult to handle and store in test equipment.

The present invention therefore is based on the finding that for testing radar equipment, radar signals can be provided as a superimposition of a sequence of a number, i.e. one or more, of short radar bursts or basic waveforms. Further, the present invention uses the knowledge that each single basic waveform can be provided with a constant frequency, level and phase for testing radar equipment, without deteriorating the results of the tests.

Therefore, instead of pre-generating a huge ARB file, the signal generator works like a sequencer and adapts basic waveforms or samples according to the control commands prior to transmission, especially in real time. The modified waveforms, when transmitted, e.g. to radar hardware, can provide the same amplitudes as the single samples in an ARB file. However, the generation of the modified waveforms requires little computing power and the basic waveforms together with the control commands require only little memory for storage.

The present invention therefore allows generating and transmitting a plurality of modified waveforms in a timely inter-related fashion, i.e. sequences of arbitrary length, especially longer than a single basic waveform, without the need to generate huge ARB files in advance and store such huge files in the test equipment.

Further embodiments of the present invention are subject of the further subclaims and of the following description, referring to the drawings.

In a possible embodiment, the signal generation device can comprise a sample memory connected to the waveform input, which stores the basic waveforms. Basic waveforms can be any type of waveform, which can be emitted by a radar antenna or any other RF signal emitter. The basic waveforms can be seen as a type of sample, which is modified in real time by the waveform processor as required or commanded by the respective control commands. The sample memory can comprise predetermined basic waveforms, i.e. samples, or can be filled with case specific basic waveforms. The sample memory can e.g. be RAM, EEPROM, a USB stick, a hard drive, a network attached storage or the like.

In a possible embodiment, the signal generation device can comprise a network interface, which connects the signal generation device to a network for loading the basic waveforms and/or control commands from a server. Furthermore, any data carrier, like a USB-Stick, a CD, DVD or the like can carry the basic waveforms and can be connected to the signal generation device, e.g. via a USB port or a CD-/DVD-drive.

In a possible embodiment, the signal generation device can comprise a command memory coupled to the command input, which stores control commands. The command memory can be of the same types as the sample memory. Further, the command memory and the sample memory can be a single memory. In one example the contents of a job description file, i.e. a single file, which comprises all the information necessary to generate and output RF signals, can comprise the control commands and the basic waveforms. The respective memories can be filled with the respective data, when the job description file is loaded into the signal generation device, e.g. from a data carrier, a network drive or the like.

In a possible embodiment, the control commands can be arranged in a sequence and the waveform processor can continuously modify the respective basic waveforms and transmit the resulting modified waveforms according to the sequence of the control commands. The sequence of control commands will therefore result in a continuous stream of RF signals being generated and transmitted via the RF frontend. Continuously in this context does not refer to a continuous emission of RF signals but to a continuous processing of the control commands as needed or as stated in the respective time stamps of the control commands.

In a possible embodiment, the waveform processor can transmit via the RF frontend a signal, which is a superimposition of at least two modified basic waveforms. If the waveform processor is capable of processing more than a single waveform in parallel, the waveform processor can generate overlapping modified waveforms, which can e.g. represent different radar sources.

In a possible embodiment, at least some of the control commands can comprise a time stamp, which defines an absolute or relative point in time, at which the respective control command is to be processed by the waveform processor, i.e. at which the respective modified waveform has to be generated and transmitted by the waveform processor. The waveform processor can e.g. process control commands, which do not comprise a time stamp in a regular timing pattern. The regular timing pattern can e.g. be provided by the control commands comprising time stamps, which can e.g. also provide a sample rate or the like.

In a possible embodiment, the control commands can comprise commands about at least one of a change in frequency of a respective basic waveform, a change in amplitude of a respective basic waveform and a change in phase of a respective basic waveform. The control commands can e.g. comprise no control information, if a basic waveform is to be transmitted without any change. Further, e.g. a flag can be set in a control command, if the same parameters are to be applied to a basic waveform as in the previous control command.

In a possible embodiment, the signal generation device comprises a real time pulse generator, which generates and modifies according to at least one of respective control commands a predetermined number of basic waveforms in real time. The real time pulse generator can e.g. generate simple waveforms, which do not require a high amount of computing power to generate without the need to provide a respective basic waveform. Furthermore, the real time pulse generator can e.g. provide modified waveforms for a number of predetermined types of modulations. Such simple waveforms can e.g. comprise sinusoidal waveforms, square waveforms, saw tooth waveforms or the like. The different modulations can e.g. comprise amplitude modulation, frequency modulation, barker modulation or the like.

In a possible embodiment, the control commands are provided in a text file, especially in an XML file, or the control commands are provided in a binary file. Text files can easily be read by a person and can therefore be generated and modified easily, e.g. with a simple text editor. If XML text files are used the semantics of the control commands can e.g. be automatically verified by respective tools. Using a binary format on the contrary will provide very compact command files.

The control commands can be generated by a simulation tool, in which radar signal sources and the device under test can be virtually placed in a landscape. In the simulation tool different signal types and radar antennas can be assigned to the radar signal sources. The antenna of the device under test can also be specified. The simulation tool will then calculate the signals as they are received at the device under test and specify respective basic waveforms and respective control commands.

The above embodiments and developments can, where practical, be combined with one another in any way. Further possible embodiments, developments and implementations of the invention also include combinations that have not been mentioned explicitly of features of the invention described above or below in relation to the embodiments. In particular, a person skilled in the art will also add individual aspects as improvements or additions to the particular basic form of the present invention.

CONTENT OF THE DRAWING

The present invention is described in greater detail below with reference to the embodiments presented in the schematic figures of the drawings, in which:

FIG. 7 shows another diagram of a sequence of basic waveforms according to an embodiment of the present invention.

Figure 1:
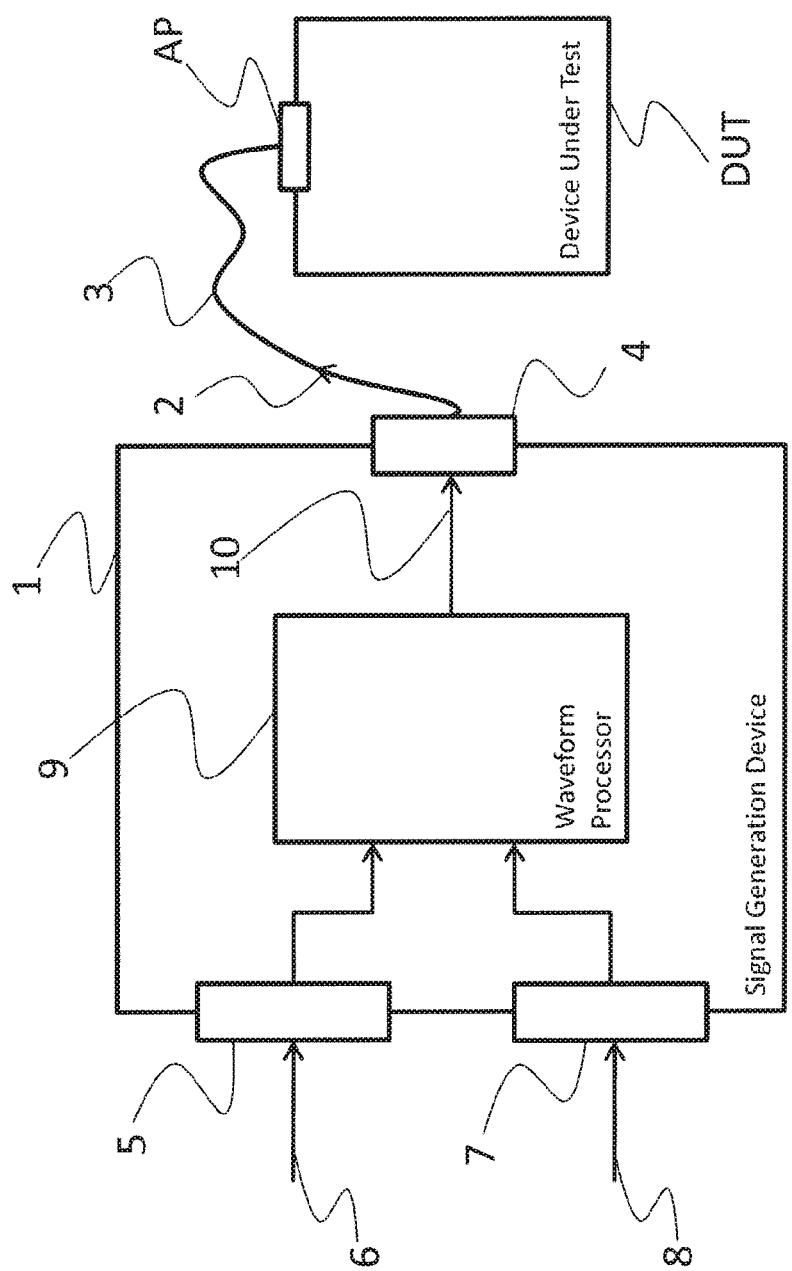
FIG. 1 shows a block diagram of an embodiment of a signal generation device according to an embodiment of the present invention.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DESCRIPTION OF EMBODIMENTS

FIG. 1 shows a block diagram of an embodiment of a signal generation device 1. The signal generation device 1 transmits RF signals 2 via a cable 3 to a device under test DUT. The cable 3 connects a RF frontend 4 of the signal generation device 1 to an antenna port AP of the device under test DUT.

The RF frontend 4 can comprise a plurality of electronic elements of any type, which are needed to generate the RF signal 2. Furthermore, the RF frontend 4 can e.g. comprise respective Digital-to-Analog converters or the like.

The basis for the RF signal 2 is formed by the waveform processor 9 based on basic waveforms 6 and respective control commands 8, which the waveform processor receives via a waveform input 5 or a command input 7, respectively.

The basic waveforms 6 can be seen as a kind of short signal snippets or waveform samples. The control commands 8 provide information to the waveform processor 9 on how to modify the respective basic waveform 6 prior to transmission to the device under test DUT. The control commands 8 can e.g. comprise information on how to modify a phase, a level or a frequency of a basic waveform 6, but are not limited to such information.

The control commands 8 can e.g. comprise digital values with single bit fields, bit sequences and/or byte sequences, which can be interpreted by the waveform processor.

On possible format of the control commands 8 can be as follows:

| PDW HOR (7 Byte) | | |
|---|---|---|
| TOA | 44 Bit | UINT, higher order bits comprise TOA |
| SEG | 1 Bit | 0 = No segment index |
| | | 1 = using segment index |
| FRQ | 1 Bit | 1 = frequency value provided |
| | | 0 = Last frequency maintained |
| LEV | 1 Bit | 1 = level value provided |
| | | 0 = last level maintained |
| PHS | 1 Bit (LSB) | 1 = phase value provided |
| | | 0 = last phase maintained |
| | FLAGS | |
| EOF | 1 Bit (MSB) | Signals the end of the waveform stream |
| RTDATA | 1 Bit | Use Real time signal generation if no segment is set |
| N/A | 1 Bit | |
| N/A | 1 Bit | |
| M4 | 1 Bit | Enable M4 from waveform |
| M3 | 1 Bit | Enable M3 from waveform |
| M2 | 1 Bit | Enable M2 from waveform |
| M1 | 1 Bit (LSB) | Enable M1 from waveform |
| FRQ = 0 | FRQ = 1 (4 Byte) | |
| X | Frequ. Offs. 32 Bit | INT32 tune word |
| LEV = 0 | LEV = 1 (2 Byte) | |
| X | Level 16 Bit | UINT16 linear. Voltage |
| PHS = 0 | PHS = 1 (2 Byte) | |
| X | Phase 16 Bit | Phase Offset |

| SEG = 1 && RTDATA N/A (3 Byte) | | | SEG = 0 && RTDATA = 1 (80 Bit) | | |
|---|---|---|---|---|---|
| Segment | 24 Bit | segment index | MOD | 4 Bit | 0x00 = Unmod |
| | | | | | 0x01 = Lin FM |
| | | | | | 0x02 = FMCW |
| | | | | | 0x03 = Barker |
| | | | | | ... |
| | | | | | 0x0F |
| | | | TON | 44 Bit | TON as TOA |
| | | | | | Barker: |
| | | | | | TON = 1 |
| | | | PAR1 | 32 Bit | depends on MOD |
| | | | PAR2 | 32 Bit | depends on MOD |
| | | | Unmodulated (Unmod): | | |
| | | | FM/Chirp (Lin FM): | | |
| | | | 64 Bit | slope | |
| | | | Barker: | | |
| | | | 4 Bit | Barker Code | |
| | | | 4 Bit | Reserved (0) | |
| | | | 13 Bit | complementary sequence (MSB first, Rest filled with 0) | |
| | | | Only first word, no second word | | |

The above is just an exemplary format for the control commands 8, where the TOA comprises the time, at which the respective basic waveform 6 should be processed and transmitted to the device under test DUT by the waveform processor 9. SEG indicates whether there is a segment number, i.e. an indication of a basic waveform 6, present in the control command 8. FRQ, LEV and PHS each indicate if there is a frequency value, a level value and a phase value present in the control command 8.

The EOF flag signals the end of the basic waveform stream. The RTDATA bit signals, whether the real time pulse generator (see FIG. 2) should be used to generate the RF signal 2. M1-M4 indicate marker signals, which can be used for signaling additional information, like e.g. pulse width, rise- and fall timer and the like.

The following 8 Bytes provide the values for frequency FRQ, level, LEV, and phase PHS, if the respective one of the above flags is set. Otherwise the bits are omitted, i.e. the size of the control command 8 is dynamically adapted.

If a basic waveform 6 is to be used as a basis for the RF signal 2, the segment, i.e. an indication to the respective basic waveform 6, is provided as a three byte value. If the real time pulse generator is to be used, 4 bits designate the type of modulation, which should be used, like e.g. unmodulated, linear FM modulation, FMCW modulation, Barker modulation.

Following a 44 bit value TON is provided, which indicates the length of the pulse, which is generated in real time.

The following parameter fields, e.g. of 32 Bit, comprise parameters for the respective modulation and can be shortened or prolonged if needed. If the signal is transmitted unmodulated, no parameters may be provided. If the signal is a FM or Chirp modulated signal, the parameters value may comprise a slope of the modulated signal, e.g. as a 64 bit value. If the signal is modulated using the barker code, the parameters may comprise a 4 bit barker code, and 13 bit of a complementary sequence.

The above scheme for control commands 8 provides compact and flexible control commands 8, which only comprise the number of bits that are needed to convey the respective information, i.e. their size varies dynamically.

The waveform processor 9 can e.g. comprise an FPGA, CPLD, microcontroller, processor or the like, which may implement a state machine or the like, to parse the control commands 8 and generate respective modified waveforms 10, which are transformed by the RF frontend 4 into the RF signal 2.

The waveform processor 9 can also be arranged to process more than one control command 8 in parallel. The RF signal 2 would then be based on more than one single basic waveform 6.

The waveform processor 9 can e.g. process one control command 8 for each one of a number of virtual radar sources.

Figure 2:
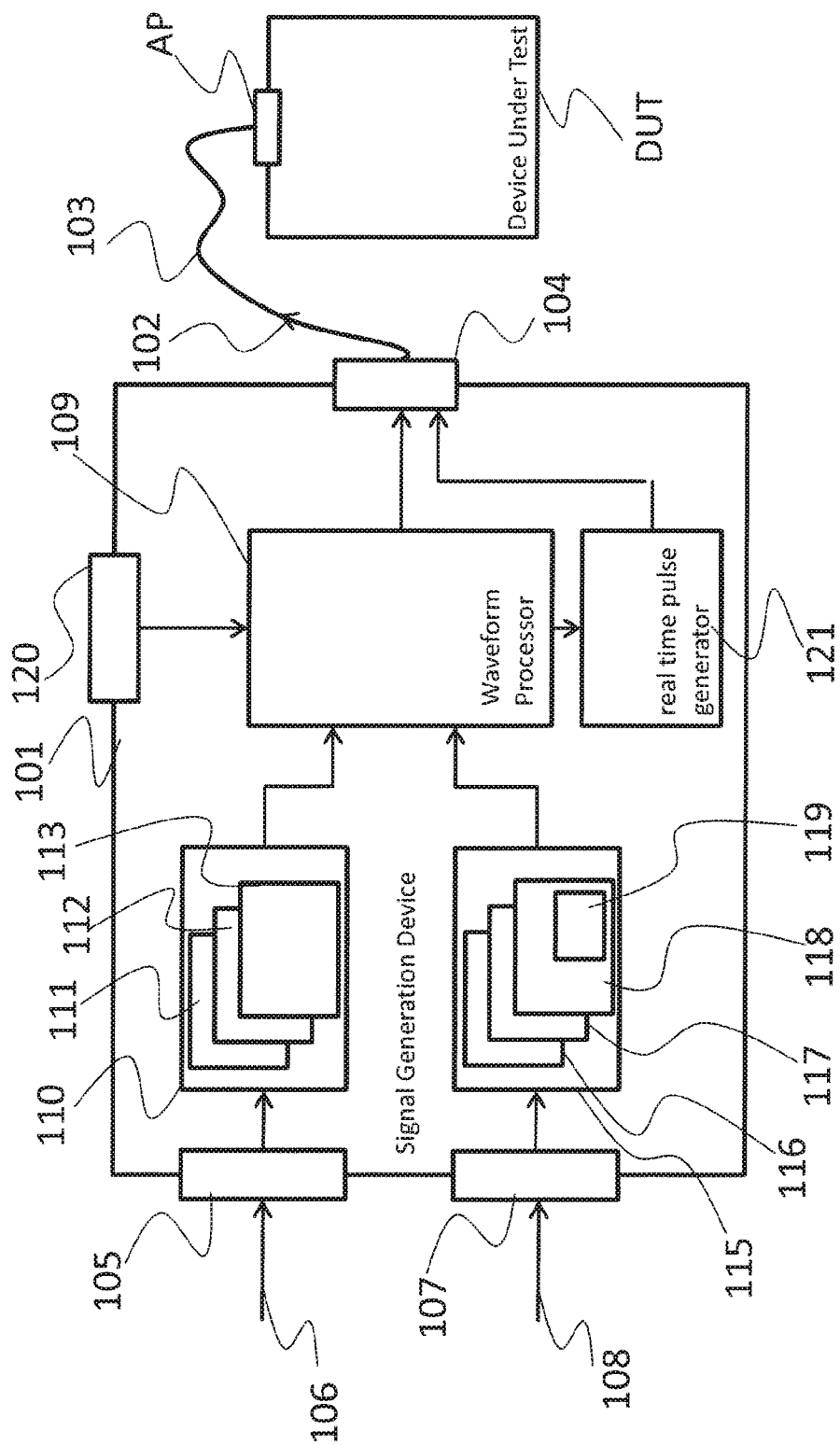
FIG. 2 shows another block diagram of an embodiment of a signal generation device according to an embodiment of the present invention.

FIG. 2 shows another block diagram of an embodiment of a signal generation device 101.

The signal generation device 101 in addition to the elements of the signal generation device 1 comprises a sample memory 110 and a command memory 115. Basic waveforms 106 can be provided via the waveform input 105 and stored as stored basic waveforms 111 to 113 in the sample memory 110. The same applies to the control commands 108, which can be provided via the command interface 107 and be stored in the command memory 115 as stored control commands 116 to 118. Each control command 116 to 118 comprises a time stamp 119, which indicates, when the waveform processor should process the respective control command 116 to 119.

Even though the memories 110 and 115 are shown as separate memories, it is to be understood, that these memories can also be included in a single memory device, like e.g. a RAM, an EEPROM, a hard disk drive, a flash drive or the like. In one example, both memories 110, 115 or at least the sample memory 110 can be part of a RAM memory, which is directly connected to the waveform processor 109. This allows the waveform processor to quickly access the RAM and read or extract the respective waveforms.

Further, a network interface 120 is provided, which allows coupling the signal generation device 101 to a computer network, like e.g. an Ethernet network, and therefore at least indirectly also to the internet. Via the network interface 110 the basic waveforms 111 to 113 and the control commands 116 to 118 can be provided to the signal generation device 101 and the waveform processor 109 from a remote location. The waveform processor 109 can then store the basic waveforms 111 to 113 and the control commands 116 to 118 in the respective memories 110, 115. Furthermore, commands for directly controlling operation of the waveform processor 109 can also be provided via the network interface 120. This allows controlling a plurality of signal generation devices 101 e.g. from a central server or central control station, which can be operated by a user. Such commands can e.g. comprise starting the signal generation, stopping the signal generation, loading new basic waveforms 111 to 113 or new control commands 116 to 118.

Finally, in FIG. 2 a real time pulse generator 121 is provided, which is capable of producing simple signal pulses in real time. Such simple signal pulses can be pulses as described above, comprising square signals, triangle signals, pulse signals, sinusoidal signals or the like. The real time pulse generator 121 is coupled to and controlled by the waveform processor 109.

In the RF frontend 104 the signals generated by the waveform processor 109 and the real time pulse generator 121 can be combined and transmitted as signal 102 to the device under test DUT.

Figure 3:
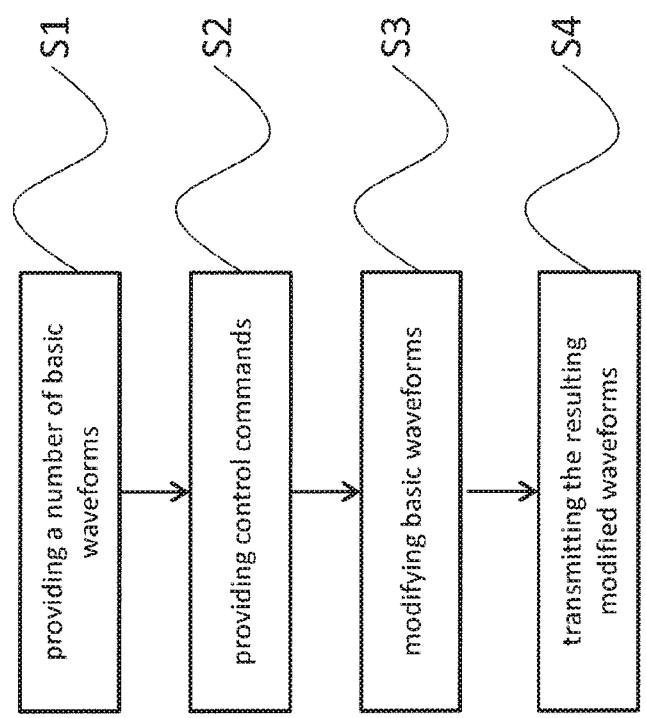
FIG. 3 shows a flow diagram of an embodiment of a method according to an embodiment of the present invention.

FIG. 3 shows a flow diagram of an embodiment of a method for generating radio frequency, RF, signals 2.

The method starts with providing S1 a number of basic waveforms 6, 106, 111 to 113, and with providing S2 control commands 8, 108, and 116 to 118, each comprising control information for modifying a respective basic waveform 6, 106, 111 to 113. The respective basic waveforms 6, 106, 111 to 113 are then modified S3 based on the control commands 8, 108, 116 to 118. After modification the resulting modified waveforms 10 are transmitted S4 as RF signals 2.

The control commands 8, 108, and 116 to 118 can comprise commands about at least one of a change in frequency of a respective basic waveform 6, 106, 111 to 113, a change in amplitude of a respective basic waveform 6, 106, 111 to 113 and a change in phase of a respective basic waveform 6, 106, 111 to 113.

After the providing S1 of the waveforms 6, 106, 111 to 113 and the control commands 8, 108, and 116 to 118, they can be stored e.g. in a sample memory 110 or a command memory 115, respectively.

To allow for an uninterrupted continuous transmission of the RF signal 2, the control commands 8, 108, and 116 to 118 can be arranged in a sequence, and the respective basic waveforms 6, 106, 111 to 113 can be continuously modified. The resulting modified waveforms 10 can then be transmitted according to the sequence of the control commands 8, 108, 116 to 118.

When transmitting the RF signal 2, not only one basic waveform 6, 106, 111 to 113 can form the basis of the RF signal 2. Instead, a superimposition of at least two modified basic waveforms 10 can be provided as a basis for the RF signal 2. This is to say, the step of modifying S3 can be performed in parallel several times, e.g. for several virtual radar sources.

At least some of the control commands 8, 108, 116 to 118 may comprise a time stamp 119, which defines an absolute or relative point in time, at which the respective control command 8, 108, 116 to 118 is to be processed to transmit a respective RF signal 2. Control commands 8, 108, 116 to 118, which do not comprise a time stamp 119 will be processed with a predetermined time laps after the last control command 8, 108, 116 to 118 was processed.

When modifying S3 according to at least one of respective control commands 8, 108, 116 to 118 a predetermined number of basic waveforms can be generated in real time.

Figure 4:
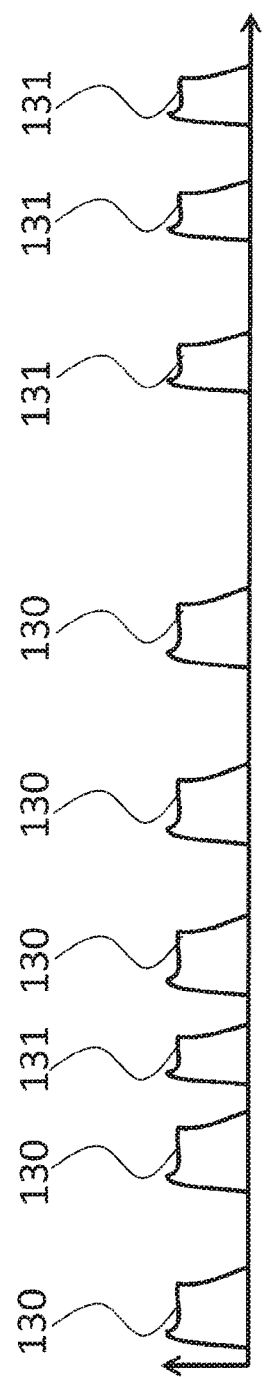
FIG. 4 shows a diagram of a sequence of basic waveforms according to an embodiment of the present invention.

FIG. 4 shows a diagram of a sequence of basic waveforms 130, 131. The sequence of FIG. 4 comprises broad first signal pulses 130 and slim second signal pulses 131.

In FIG. 4 two first pulses 130 are followed by a second pulse 131, which is followed by three first pulses 130 and three second pulses 131.

If such a sequence would be generated as ARB file, which comprises the I and Q values for every point in time with a respective sample rate, the ARB file could be very huge.

Instead, with the present invention, such a sequence can be generated simply by providing two basic waveforms 130, 131 and a respective control command for every instance of the basic waveforms 130, 131. In the present case in addition to the two basic waveforms 130, 131 only 9 control commands would be necessary. Such control commands could e.g. have the above described format and would therefore only comprise a small number of bytes each.

As can be seen in FIG. 4 the first basic waveform 130 and the second basic waveform 131 are very similar, only that the second basic waveform 131 is a shorter or compressed version of the first basic waveform 130. Therefore, in one embodiment instead of providing two different basic waveforms 130, 131 there could be provided a single basic waveform 130 and the respective parameters could be set in the control commands, which would lead to a modified waveform like waveform 131.

Figure 5:
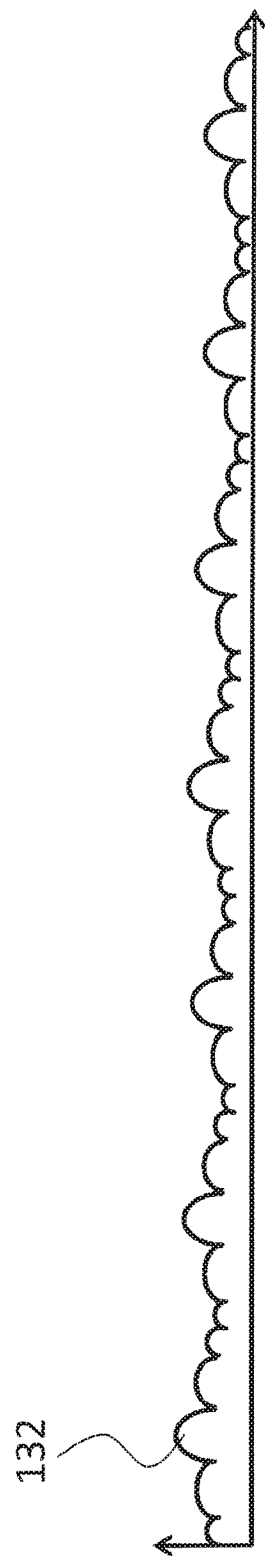
FIG. 5 shows a diagram of an antenna scan of a transmitting antenna according to an embodiment of the present invention.

FIG. 5 shows a diagram of an antenna scan and pattern of a transmitting antenna. It can be seen that the antenna attenuation is not constant. Instead, the attenuation varies over time.

The diagram of FIG. 5 shows the antenna attenuation for a specific focal direction of the antenna over time. The variation in the attenuation can e.g. be due to a movement or an electrical tuning of the transmitting antenna.

Figure 6:
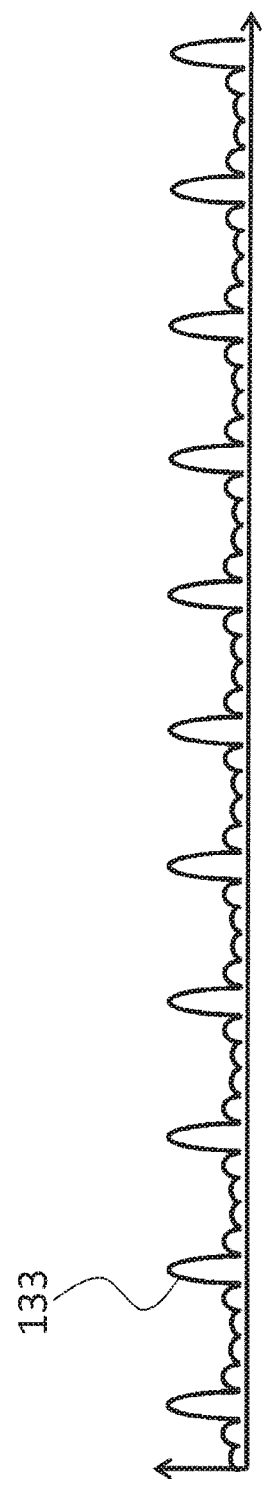
FIG. 6 shows a diagram of an antenna scan of a receiving antenna according to an embodiment of the present invention.

FIG. 6 shows a diagram of an antenna scan of a receiving antenna. As with the antenna of FIG. 5, the attenuation of the receiving antenna is not constant, this again can be a result of a scanning movement of the receiving antenna.

FIG. 7 shows a diagram of a sequence of basic waveforms 134 superimposed with the antenna scans of FIGS. 5 and 6. The scale of the diagram is smaller, i.e. zoomed-in, in contrast to FIGS. 5 and 6. Further, a schematic version of antenna scans 132, 133 is applied, which is referenced by an envelope 135.

The RF signal 2 as it will be transmitted to the device under test DUT can e.g. be generated by multiplying the respective sections of the antenna scans. This will result in a signal strength factor, which can be applied to the basic waveforms.

As a result of such a multiplication, the single instances of the basic waveform 133 are each scaled according to the envelope 135.

The signal strength factor is assumed to be constant over the duration of a single basic waveform 6, 106, 111-113. This especially applies, because the length of any basic waveform will usually be magnitudes shorter than the duration of a single period of the antenna scan pattern or antenna scan 132, 133. For example the period of a turn of an airport radar antenna could be about 4 s, while the length of a basic waveform could be about 100 us.

The signal generation device 1, 101 will therefore provide the device under test DUT with RF signals 2, which transport the modified basic waveforms 134.

It is to be understood, that the diagram of FIG. 7 only servers to illustrated the principles of the present invention, and that although only one basic waveform 133 is used in FIG. 7 any number of basic waveforms could be used.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for streamlining the disclosure. It is understood that the above description is intended to be illustrative, and not restrictive. It is intended to cover all alternatives, modifications and equivalents may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

What we claim is:

1. A signal generation device, for generating radio frequency, RF, signals, the signal generation device comprising:
   a waveform input for receiving a number of basic waveforms, wherein a basic waveform is a digital representation of a RF signal pulse, the RF signal pulse being a square signal, triangle signal, or sinusoidal signal and the number of basic waveforms is stored in a sample memory connected to the waveform input;
   a control command input for receiving control commands each comprising control information for modifying a respective basic waveform,
   a RF frontend comprising a digital-to-analog converter and a RF signal transmitter for transmitting RF signals, and
   a waveform processor configured to:
      modify parameters of a respective basic waveforms based on the control commands, wherein:
         the control commands are arranged in a sequence; and
         the control commands comprise commands about parameters including a change in frequency of a respective basic waveform, a change in amplitude of a respective basic waveform and a change in phase of a respective basic waveform; and
      transmit the resulting modified basic waveforms through the RF frontend according to the sequence of the control commands, wherein the sequence of control commands comprises a first control command and a second control command, wherein the second control command is immediately subsequent to the first control command in the sequence of control commands and wherein a flag is set in the second control command;
      in response to determining that the flag is set in the second control command, the waveform processor is configured to apply the same parameters to the modify the respective basic waveform for the second control command as were applied to modify the respective basic waveform for the first control command.

2. The signal generation device of claim 1, comprising a network interface, which connects the signal generation device to a network for loading the basic waveforms from a waveform server.

3. The signal generation device of claim 1, comprising a command memory coupled to the command input, which stores control commands.

4. The signal generation device of claim 1, wherein the waveform processor transmits via the RF frontend a signal, wherein the signal is a superimposition of at least two modified basic waveforms.

5. The signal generation device of claim 1, wherein at least some of the control commands comprise a time stamp at which the respective control command is to be processed by the waveform processor.

6. The signal generation device of claim 1, wherein the control commands are provided in a text file, in an XML file, or wherein the control commands are provided in a binary file.

7. A method for generating radio frequency, RF, signals, the method comprising:
 providing a number of basic waveforms, wherein a basic waveform is a digital representation of a RF signal pulse, the RF signal pulse being a square signal, triangle signal, or sinusoidal signal and the number of basic waveforms is stored in a sample memory connected to a waveform input,
 providing control commands, wherein each control command comprises control information for modifying parameters of a respective basic waveform, wherein the control commands are arranged in a sequence,
 modifying parameters of the respective basic waveforms according to the sequence of control commands, wherein the control commands comprise commands about parameters including a change in frequency of a respective basic waveform, a change in amplitude of a respective basic waveform and a change in phase of a respective basic waveform; and
 transmitting the resulting modified basic waveforms as RF signals according to the sequence of the control commands, wherein the sequence of control commands comprises a first control command and a second control command, wherein the second control command is immediately subsequent to the first control command in the sequence of control commands and wherein a flag is set in the second control command;
 in response to determining that the flag is set in the second control command, applying, by the waveform processor the same parameters to the modify the respective basic waveform for the second control command as were applied to modify the respective basic waveform for the first control command.

8. The method of claim 7, comprising loading the basic waveforms from a network storage.

9. The method of claim 7, comprising storing the control commands, especially in a command memory.

10. The method of claim 7, wherein transmitting comprises transmitting a signal, wherein the signal is a superimposition of at least two modified basic waveforms.

11. The method of claim 7, wherein at least some of the control commands comprise a time stamp at which the respective control command is to be processed to transmit a respective RF signal.

12. The method of claim 7, wherein the control commands are provided in a text file, in an XML file, or wherein the control commands are provided in a binary file.

* * * * *